(12) United States Patent
Lin

(10) Patent No.: US 12,556,503 B2
(45) Date of Patent: Feb. 17, 2026

(54) SYNCHRONOUS AND ASYNCHRONOUS CONTENT FILTERING

(71) Applicant: Salesforce, Inc., San Francisco, CA (US)

(72) Inventor: Chaney Lin, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 29 days.

(21) Appl. No.: 18/790,179

(22) Filed: Jul. 31, 2024

(65) Prior Publication Data

US 2026/0039618 A1 Feb. 5, 2026

(51) Int. Cl.
*H04L 51/212* (2022.01)
*G06F 40/35* (2020.01)

(52) U.S. Cl.
CPC ............ *H04L 51/212* (2022.05); *G06F 40/35* (2020.01)

(58) Field of Classification Search
None
See application file for complete search history.

(56) References Cited

U.S. PATENT DOCUMENTS

| | | | | |
|---|---|---|---|---|
| 7,483,947 B2* | 1/2009 | Starbuck | ............... | H04L 51/212 709/225 |
| 7,870,203 B2* | 1/2011 | Judge | ................... | G06Q 10/107 709/201 |
| 9,665,559 B2* | 5/2017 | Gross | ..................... | G06F 40/253 |
| 11,170,064 B2* | 11/2021 | David | .................... | H04L 51/10 |
| 11,238,241 B1* | 2/2022 | Mallikarjuniah | ....... | H04L 51/02 |
| 11,475,883 B1* | 10/2022 | Mallikarjuniah | ... | G10L 15/1815 |
| 11,805,185 B2* | 10/2023 | Tongya | .................... | G06F 40/35 |
| 11,983,716 B2* | 5/2024 | Hochma | ............... | G06N 3/0499 |
| 12,004,256 B2* | 6/2024 | Phillips | ................. | H04W 76/20 |
| 12,405,978 B2* | 9/2025 | Madisetti | ............. | G06F 16/3325 |
| 2010/0010940 A1* | 1/2010 | Spyropoulos | ......... | G06F 18/256 706/54 |
| 2020/0067861 A1* | 2/2020 | Leddy | .................. | G06F 21/6245 |
| 2022/0351716 A1* | 11/2022 | Kim | ...................... | G06N 3/0464 |

\* cited by examiner

*Primary Examiner* — Backhean Tiv
(74) *Attorney, Agent, or Firm* — Lee & Hayes, P.C.

(57) ABSTRACT

Techniques for filtering out undesirable generative machine learned model (or LLM) output are discussed herein. A system may receive a subset of an LLM output. That is, the system may stream the LLM output to a user device by receiving one or more tokens from the LLM and outputting such token(s) to a user device. However, prior to outputting the token(s) to the user device, the system may determine whether the token(s) include undesirable content that is to be blocked. The system may use synchronous blocking components (e.g., blocks the undesirable token(s) before such token(s) get output to the user device) and/or asynchronous blocking components (e.g., blocks the undesirable token(s) after the token(s) have been output to the user device) to filter out undesirable content. The synchronous and/or asynchronous blocking components may be designed to block one or more undesirable topics such as hateful speech, profanity, bias, toxicity, factualness, etc.

20 Claims, 5 Drawing Sheets

SYNCHRONOUS AND ASYNCHRONOUS CONTENT FILTERING

TECHNICAL FIELD

Users may use one or more systems and/or platforms to perform various tasks. In some cases, the users may input information to the system and request that the system perform an operation based on such information. However, when requesting that the systems and/or platforms perform an operation based on the information, the operations may result in an undesirable user experience.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
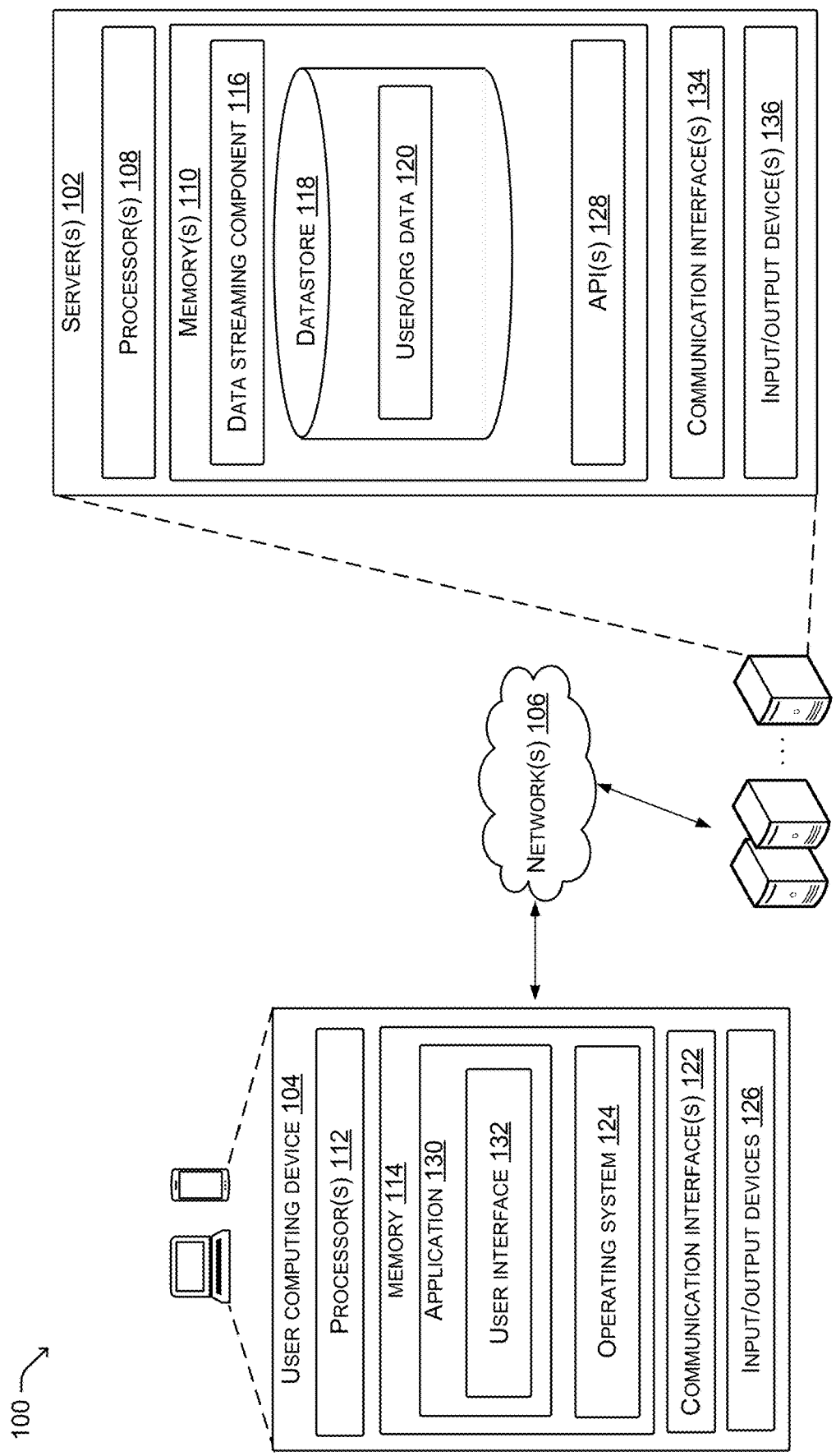
FIG. 1 illustrates an example system for performing techniques described herein.

Techniques for filtering out undesirable generative machine learned model output are discussed herein. In some examples, a system may receive a subset of a generative machine learned model (hereinafter referred to as an "LLM") output. That is, the system may stream the LLM output to a user device by receiving one or more tokens (e.g., less than the entire LLM response) from the LLM and outputting such token(s) to a user device. However, prior to outputting the token(s) to the user device, the system may determine whether the token(s) include undesirable content that is to be blocked. The system may use synchronous blocking components (e.g., blocks the undesirable token(s) before such token(s) get output to the user device) and/or asynchronous blocking components (e.g., blocks the undesirable token(s) after the token(s) have been output to the user device) to filter out undesirable content. The synchronous and/or asynchronous blocking components may be designed to block one or more undesirable topics such as hateful speech, profanity, bias, toxicity, factualness, etc. As discussed throughout this disclosure, the techniques may improve the user experience by decreasing the perceived latency of LLM output while increasing the ability to remove undesirable content from the final output response.

When using an LLM to interface with users, it may be beneficial to block and/or filter out undesirable content while streaming the LLM response to a user device. For example, a user may perceive a high degree of latency from the time the user profile enters the input (or request) to the system to the time that the LLM outputs the response. Such a high degree of latency may negatively impact the user experience. In these cases, existing systems may use a non-streaming output technique. Non-streaming may be when the LLM receives the input from the user profile and outputs an entire (or complete) block of text (or other content) in return. In the case of non-streaming, the user may perceive a higher level of latency since the LLM waits until the entire response is available to output prior to outputting to the user profile. Accordingly, the techniques and systems described herein may include reducing the perceived latency problem by introducing a streaming technique that filters out undesirable content. Streaming may be when the LLM receives the input from the user profile and outputs one token or a group of tokens (or characters) at a time. That is, instead of waiting for a complete response to output to the user profile, the system may stream the content to the user profile which may get the user engagement started by outputting partial responses in batches as such responses become available. Further, the systems described herein discuss techniques to filter out undesirable content while streaming such LLM output to the user device.

To address these and other technical problems and inefficiencies, the systems and/or techniques described herein may include a data streaming component (which also may be referred to as a "data streaming system") configured to filter out undesirable output from an LLM to be streamed to a user profile. The technical solutions discussed herein solve one or more technical problems associated with high perceived latency of LLM output and/or the display of undesirable content.

In some examples, a system may receive a request for an LLM to perform an action. That is, a user profile may submit a request to the system for the system to perform an action. The user profile may submit the request by verbally commanding (e.g., speaking-audio data) the system to perform an action, interacting with a user device that uses the system (e.g., clicking or touching a user interface object within the system, typing and/or submitting text to a text entry box within the system, etc.), etc. In some examples, the request may include an instruction for the system (or LLM) to perform an action. The actions may include summarizing data, synthesizing data, generating documents, responding to question(s) and/or prompt(s), receiving data, etc.

In some examples, the system may generate input data to input into the LLM based on the request. That is, the system may retrieve data to input into the LLM and use such data as the input data. The system may generate the input data by retrieving data from one or more sources. Such sources may include one or more databases within or otherwise associated with the system, information associated with the request (e.g., the question or command included in the request), etc. As such, the system may incorporate data from various sources when generating the input data.

In some examples, the system may input the input data into the LLM. In some examples, the input data may include non-masked data (e.g., non-sensitive or restricted data) and/or masked data (e.g., corresponding to sensitive data, restricted data, etc.). The system may include one or more generative machine learned models (e.g., LLMs) that may be trained to perform various system operations. In some cases, the system may train the LLMs to perform specific tasks. Accordingly, the system may input the input data into the LLM.

In some examples, the system may receive a subset (e.g., less than all) of an entire response from the LLM. The LLM may be trained to output the response in a streaming manner. That is, the LLM may output one token (e.g., unit of data (e.g., letter, number, etc.)) or a group of tokens (e.g., two or more characters-less than the entire response) at a time. Based on receiving the token(s), the system may perform one or more operations on the token(s) and output (or stream) the token(s) to the user profile. That is, the system can output tokens to the user profile prior to the entire LLM response being generated.

In some examples, prior to outputting the token(s) (or subset of the response) to the user device, the system may determine whether to block (or filter out) the token(s). The system may block the token(s) if the token(s) are identified as including undesirable content. Such undesirable content may include hateful speech, profanity, bias, toxicity, factualness, etc. In some examples, users and/or organizations may configure the system such as to define which of the undesirable types of content to block. That is, as an example, a user or organization may instruct the system to block content related to hateful speech and bias, but not token(s) related to factualness. In other examples, the system may include a list of one or more undesirable types of content that overrides the topics provided by the user and/or organization.

In some examples, the system may use one or more blocking components (or blocking detectors) to detect token(s) related to undesirable content. For example, the system may include a hateful speech blocking component designed to determine whether the token(s) include hateful speech, a profanity blocking component designed to determine whether the token(s) include profanity, a bias blocking component designed to determine whether the token(s) include bias towards a specific perspective, a type of lifestyle, etc., a toxicity blocking component designed to determine whether the token(s) include toxic language, and/or a factualness blocking component designed to determine whether the token(s) incudes inaccurate or factual information. Of course, in other examples, the system may include more or less blocking components designed to block the same or different topics. In some examples, the abovementioned blocking components may use one or more machine learned models, classifiers, rules, and/or heuristics to determine whether the token(s) qualify to be blocked based on the type of blocking component.

In some examples, the system may block some or all types of undesirable content synchronously and/or asynchronously. That is, certain types of blocking detectors may be configured to block undesirable content before the token(s) are output to the user while other types of blocking detectors may be configured to block undesirable content after the token(s) have been output to the user. In some examples, the users and/or organizations may select or otherwise determine which blocking components are synchronous blocking components and which blocking components are asynchronous blocking components. For example, a user may indicate that the user does not want to see any hateful speech and as such, the hateful speech blocking component may be a synchronous blocking component such that hateful speech is not output to the user. Further, the user may indicate that the user allows profanity to be presented and as such, the profanity blocking detector may be an asynchronous blocking component. In some examples, the system may send the token(s) to the synchronous blocking components. Upon determining whether to synchronously block the token(s), the token(s) may be sent to the asynchronous blocking component(s).

In some examples, the system may include a state component (or state management component) configured to manage and/or receive data (or result(s)) from the various blocking detectors. The state component may listen to (or receive data from) all of the synchronous and/or asynchronous blocking component(s). Each blocking component may operate independent of the other blocking component(s) and as such, each blocking component may send unique data (e.g., whether to block the token(s), whether the token(s) quality as a type of content, etc.) to the state component. In some examples, when sending the token(s) to the synchronous blocking component(s), the system may also send the token(s) to the state component such that the state component has a list of all the token(s) that have been output by the LLM. The state component may maintain a record that indicates which synchronous and/or asynchronous blocking components have evaluated which token(s). When all the synchronous blocking component(s) have evaluated specific token(s), the state component may determine whether to block the token(s) or output the token(s) to the user device. When all of the asynchronous blocking component(s) have evaluated specific token(s), the state component may determine whether to remove the token(s) from the user device or to allow the token(s) to remain displayed. In some examples, the state component may determine the outcome of the token(s) after the state component has received the result(s) (or data) from all the applicable blocking component(s).

In some examples, the state component may determine whether to block token(s) based on the data (or result(s)) received from the blocking component(s). The state component may determine that token(s) are to be blocked (either synchronously or asynchronously) if any of the blocking detectors indicate as such. That is, the state component may receive, from the blocking component(s), the token(s) and/or an indication as to whether such content is to be blocked. As such, upon receiving the results from each of the applicable blocking component(s), the state component may determine whether to block the token(s).

As such, upon receiving the token(s) from the LLM, the system may send the token(s) to the synchronous blocking component(s) and to the state component. In such cases, the synchronous blocking component(s) may analyze the token(s) to determine whether the token(s) include undesirable content. However, in some cases, the blocking component(s) may need differing numbers of token(s) to make an accurate determination as to whether the token(s) contain undesirable content. As such, each blocking component may have a buffer with a unique buffer size. For example, the profanity blocking component may have a buffer size of five tokens while the factualness blocking component has a buffer size of 20 tokens. As such, the profanity blocking component may make an accurate determination as to whether the token(s) include profanity with five token(s) whereas the factualness blocking component may need 20 tokens to make an accurate determination. Of course, in other examples, the buffer sizes may be based on a global buffer size where all the blocking components have the same buffer size, a global logic based buffer size where a criteria is used to determine when all the blocking components scored at the same time (e.g., score every time the token(s) include punctuation), a blocking component dependent size where each blocking detector has its own size, etc.

In such examples, the state component may receive results from the synchronous blocking component(s) at varying times based on the buffer sizes of each component. Accordingly, when the state component determines that each of the synchronous blocking component(s) have sent result(s) regarding a certain token, the state component may determine whether to synchronously block the token. In some examples, the state component may determine that the token(s) are allowed to be output to the user device when none of the synchronous blocking component(s) instruct the state component to block the token(s). Based on displaying the token(s) to the user device, the state component (or the system) may send the token(s) to the applicable asynchronous blocking components. In such instances, the asynchronous blocking components may evaluate the token(s) to determine whether such token(s) are to be removed (or blocked) from the user device.

In some examples, the asynchronous blocking component(s) may receive the token(s) after the token(s) have been output to the user device. Similar to the synchronous blocking component(s), the asynchronous blocking components may have a buffer with unique buffer sizes. That is, for the asynchronous blocking components to accurately determine whether the token(s) include undesirable content, certain asynchronous blocking components may need a larger buffer (e.g., more token(s)) than other components. When the status of the buffer indicates that the buffer is full of tokens (e.g., number of added tokens matches the buffer size), the asynchronous blocking components may determine whether to block the token(s). In some examples, the asynchronous blocking components may send individual (or unique) results to the state component. The state component may receive the results from the asynchronous blocking components and determine whether to allow the token(s) to remain displayed or whether to remove the token(s) (or block the token(s)).

In some examples, the system may continuously perform the above mentioned operations on all token(s) until the LLM has output the entire response (or an entirety of the response). Upon blocking and/or outputting the entirety of the token(s), the system may perform a final evaluation that considers the entire output. That is, the system may receive all of the token(s) that have been output to the user device (or all the tokens that have been output from the LLM) and determine whether to refine the output. That is, the system may send a notification to the user device that the system is performing a final evaluation. The notification may be in the form of disabling buttons (or user interface elements) on the user device, greying out buttons, displaying a progress bar, displaying a popup box (or overlay interface) stating that a revision of the output is taking place.

In some examples, the system may perform the final evaluation by inputting the entire output into some or all of the blocking detectors. In such cases, the blocking detectors may identify token(s) within the entire output to block. As such, the system may modify the entire output to block or filter out certain tokens. Based on completing the final evaluation, the system may cause the modified output to be output (e.g., visually, audibly, etc.) to the user device.

Additionally or alternatively, the system may enable the users to create their own blocking detectors. That is, a user may identify a topic (e.g., spoilers for a movie, scores to sports, political discourse, etc.) to block and request that the system block the topic from being output. In such cases, the system may train one or more machine learned models to identify the topic and the state component may include the new blocking component when determining whether such token(s) are to be blocked or output. Accordingly, the system may filter out any type of content that meets a criteria (e.g., the topic the user does not want to see).

As illustrated by these examples, the techniques described herein can improve the functioning, efficiency, and overall user experience of the communication platform. That is, the techniques described herein may enable the system to reduce the perceived latency of systems that leverage LLMs while also removing undesirable content from the LLM output. The techniques may result in an increased and/or an enhanced user experience.

The following detailed description of examples references the accompanying drawings that illustrate specific examples in which the techniques can be practiced. The examples are intended to describe aspects of the systems and methods in sufficient detail to enable those skilled in the art to practice the techniques discussed herein. Other examples can be utilized and changes can be made without departing from the scope of the disclosure. The following detailed description is, therefore, not to be taken in a limiting sense. The scope of the disclosure is defined only by the appended claims, along with the full scope of equivalents to which such claims are entitled.

FIG. 1 illustrates an example environment 100 for performing the techniques described herein. The techniques discussed herein may be used in a variety of environments and for a variety of uses, although the examples given herein discuss a customer service environment as one of these use cases since it's a use case familiar to many. In additional or alternate examples, the computing environment may comprise computing devices used for sales-based systems, communication platforms, chat engines, cybersecurity, search engines, multi-agent/agentic machine-learned model pipeline(s) and/or cluster(s), machine-learned model training, cloud/distributed computing or massive computing efficient data storage and/or retrieval, and/or the like.

In at least one example, the example environment 100 can include one or more computing devices, such as server(s) 102 and/or a user computing device(s) 104. By way of example and not limitation, the server(s) 102 may be representative of servers for hosting the software, hardware, containers, and/or the like to implement at least part of the techniques discussed herein. For example, the server(s) 102 may host (e.g., store and/or execute) system software. The user computing device(s) 104 may be representative of user computing device(s) associated with a first user (i.e., a first "client device").

The server(s) 102 may comprise one or more individual servers or other computing devices that may be physically located in a single central location or may be distributed at multiple different locations. The server(s) 102 communication may be hosted privately by an entity administering all or part of the environment 100 (e.g., a utility company, a governmental body, distributor, a retailer, manufacturer, etc.), or may be hosted in a cloud environment, or a combination of privately hosted and cloud hosted services. In some examples, the functional components and/or data discussed herein can be implemented on a single server, a cluster of servers, a server farm or data center, a cloud-hosted computing service, a cloud-hosted storage service, and so forth, although other computer architectures can additionally or alternatively be used. Moreover, the server(s) 102 may comprise hardware and/or software containers accessible to different tenants with access to the server(s) 102.

The user computing device(s) 104 may be any suitable type of computing device, e.g., portable, semi-portable, semi-stationary, or stationary. Some examples of the user computing device(s) 104 can include a tablet computing device, a smart phone, a mobile communication device, a laptop, a netbook, a desktop computing device, a terminal computing device, a wearable computing device, an augmented reality device, an Internet of Things (IoT) device, or any other computing device capable of sending communications and performing the functions according to the techniques described herein. In some examples, the user computing device(s) 104 may comprise distributed computing devices, server(s), etc.

In some examples, the server(s) 102 and/or user computing device(s) 104 may be configured to transmit network packages therebetween via network(s) 106. The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, cellular network, or any other such network, or any combination thereof. The network(s) 106 may comprise a single network or collection of networks, such as the Internet, a corporate intranet, a virtual private network (VPN), a local area network (LAN), personal area network (PAN), metropolitan area network (MAN), a wireless local area network (WLAN), a cellular network, a wide area network (WAN), a metropolitan area network (MAN), or a combination of two or more such networks, over which the user computing device(s) 104 may transmit a request to and/receive an output from the server(s) 102 via the communication platform. Components used for such communications can depend at least in part upon the type of network, the environment selected, or both. Further, the network(s) 106 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The server(s) 102 and the user computing device(s) 104 described herein may include one or more processors and/or memory. Specifically, in the illustrated example, server(s) 102 may include processor(s) 108 and memory 110 and user computing device(s) 104 include processor(s) 112 and memory 114.

By way of example and not limitation, the processor(s) 108 and/or 112 may comprise one or more central processing units (CPUs), graphics processing units (GPUs), tensor processing units (TPUs), field-programmable gate arrays (FPGAs), and/or process-acceleration devices such as application-specific integrated circuits (ASICs) or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions. For example, the processor(s) 108 and/or 112 can be one or more hardware processors and/or logic circuits of any suitable type specifically programmed or configured to execute the algorithms and processes described herein. The processor(s) 108 and/or 112 can be configured to fetch and execute computer-readable instructions stored in the computer-readable media, which can program the processor(s) to perform the functions described herein.

The memory 110 and/or 114 may comprise one or more non-transitory computer-readable media and may store software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/flash-type memory, RAM, ROM, EEPROM, flash memory, optical storage, solid state storage, magnetic tape, magnetic disk storage, RAID storage systems, storage arrays, network attached storage, storage area networks, cloud storage, or any other medium for storing information. The architectures, systems, and individual elements described herein may include many other logical, programmatic, and physical components, of which those shown in the accompanying figures are merely examples that are related to the discussion herein. The memory 110 and/or 114 can be used to store any number of software/functional components that are executable by the processor(s) 108 and/or 112, respectively. In many implementations, these functional components comprise instructions or programs that are executable by the processor(s) 108 and/or 112 and that, when executed, specifically configure the processor(s) 108 and/or 112 to perform the actions server(s) 102 and/or user computing device(s) 104, according to the discussion herein.

For example, server(s) 102 may comprise a memory 110 storing the data streaming component 116. In some examples, the data streaming component 116 may filter out undesirable LLM output. The data streaming component 116 may receive a subset of an LLM output. That is, the data streaming component 116 may stream the LLM output to a user device by receiving the one or more tokens (e.g., less than the entire LLM response) from the LLM and outputting such token(s) to a user device. However, prior to outputting the token(s) to the user device, the data streaming component 116 may determine whether the token(s) correspond to undesirable content that is to be blocked. The data streaming component 116 may use synchronous blocking components (e.g., blocks the undesirable token(s) before such token(s) get output to the user device) and/or asynchronous blocking detectors (e.g., blocks the undesirable token(s) after the token(s) have been output to the user device) to filter out undesirable content. The synchronous and/or asynchronous blocking components may be designed to block one or more undesirable topics such as hateful speech, profanity, bias, toxicity, factualness, etc.

The memory 110 may additionally or alternatively comprise a portion of memory 110 (e.g., one or more memories or a portion of a single memory) that collectively forms a datastore 118 (e.g., a database). In some examples, the datastore 118 can be integrated with the server(s) 102, as shown in FIG. 1. In other examples, the datastore 118 can be located remotely from the server(s) 102 and can be accessible to the server(s) 102 and/or user device(s), such as the user computing device(s) 104. The datastore 118 can comprise multiple databases, which can include user/org data 120. Additional or alternative data may be stored in the data store and/or one or more other data stores.

In at least one example, the user/org data 120 can include permission data associated with permissions of individual users of the system or environment (e.g., sales-based platform, chat engine, search engine, etc.). In some examples, permissions can be set automatically or by an administrator of the platform, an employer, enterprise, organization, or other entity that utilizes the platform, a team leader, a group leader, or other entity that utilizes the platform for communicating with team members, group members, or the like, an individual user, or the like. Permissions associated with an individual user can be mapped to, or otherwise associated with, an account or profile within the user/org data 120. In some examples, such users can be defined by common access credentials, group identifiers, or the like, as described above.

In at least one example, the user/org data 120 can include data associated with one or more organizations of the platform. In at least one example, the user/org data 120 can store data in organization profiles, which can store data associated with an organization (or company), including, but not limited to, one or more user identifiers associated with the organization, one or more virtual space identifiers associated with the organization (e.g., workspace identifiers, communication channel identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

It will be appreciated that the terms "datastore," "database," "repository," and "network database" may be used interchangeably in areas of the present disclosure. As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like. Moreover, data may be transmitted, received, or otherwise exchanged as individual "data objects" comprising interrelated data. Data objects may constitute single bits of data or large quantities of interrelated data, such as substantive data (e.g., the underlying content to be conveyed through a communication) and associated metadata (e.g., data not otherwise considered to be substantive data, encompassing characteristics of the substantive data and/or the relevant exchange (e.g., the identity of the user sending the data, the identity of the user receiving the data, the time/date when the data was sent, formatting to be associated with the exchanged substantive data, the file type of the data object, and/or the like).

The memory 110 may additionally or alternatively store application programming interface(s) (API(s) 128), hypervisor(s), container orchestration system(s), an operating system, and/or container (unillustrated). The API(s) 128 may expose back-end functions and/or services hosted by the server(s) 102 to the user computing device(s) 104 and/or different component(s) hosted by the server(s) 102 without transferring the functions/services/software to those computing device(s) and/or by accomplishing the functions and/or services at the server(s) 102. As relates to the instant discussion, this may comprise API(s) for receiving indications from a user (e.g., as part of an API call), or from different ones of the components.

In some examples, software executed at the user computing device(s) 104, such as a client application 130, may generate API call(s) to the API(s) 128 and/or any of the component(s) discussed herein may transmit call(s) to the API(s) 128 and/or receive responses from the API(s) 128. For example, a user interface 132 executed by a client application 130 may display actuatable/selectable options to request that the client application 130 perform an action. In some examples, the client application 130 may interface with the API(s) 128 to authenticate a user and grant or deny the user access to a portion of the datastore 118 and/or data streaming component 116.

The memory 110 may additionally or alternatively an operating system and/or container. In some examples, one or more containers may be instantiated by a cloud orchestrator and may run the operating system and may execute one or more instances of the API(s) 128 and the data streaming component 116 and may permit access to a portion of the datastore 118 according to permissions associated with a user and an organization associated with the container.

In some examples, the server(s) 102 may further comprise communication interface(s) 134, which can include one or more interfaces and hardware components for enabling communication with various other devices (e.g., the user computing device(s) 104), such as over the network(s) 106 or directly. In some examples, the communication interface(s) 134 can facilitate communication via WebSockets, APIs (e.g., using API calls), Hypertext Transfer Protocols (HTTPs), etc. The server(s) 102 can further be equipped with various input/output devices 136 (e.g., I/O devices). Such input/output devices 136 can include a display, various user interface controls (e.g., buttons, joystick, keyboard, mouse, touch screen, etc.), audio speakers, connection ports, and so forth.

In at least one example, the user computing device(s) 104 can include processor(s) 112, memory 114, communication interface(s) 122, and/or input/output device(s) 126. The memory 110 may store and execute a client application 130 and/or an operating system 124. In some examples, the client application 130 may be configured to authenticate a user to access data and/or services hosted by the server(s) 102. The API(s) 128 may filter the users and/or orgs accessible depending on permissions granted to a type of user profile and/or an organization associated with the user. In at least one example, a user profile to which a user authenticates can include permission data associated with permissions of individual users of the platform. In some examples, permissions can be set automatically or by an administrator of the platform, an employer, enterprise, organization, or other entity that utilizes the platform, a team leader, a group leader, or other entity that utilizes the platform for communicating with team members, group members, or the like, an individual user, or the like. Permissions associated with an individual user can be mapped to, or otherwise associated with, an account or profile. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the platform by maintaining security for limiting access to a defined group of users. In some examples, such users can be defined by common access credentials, group identifiers, or the like, as described above.

In some examples, the client application 130 may additionally or alternatively comprise instructions executable by one or more processors to provide a user interface 132. For example, the user interface 132 may comprise a graphical user interface (GUI), that the instructions may cause to be displayed via at least one of the input/output device(s) 126. In at least one example, the client application 130 can be a mobile application, a web application, a database interface (e.g., such as an application that presents a SQL or other database interface), or a desktop application. For example, a computing device of the one or more user computing device(s) 104 may access the API(s) 128 via a web browser or stand-alone application (either of which may be part of or host the client application 130) that communicates via network(s) 106 with API(s) 128.

In at least one example, the operating system 124 can manage the processor(s) 112, memory 114, hardware, software, etc. of the server(s) 102.

Figure 2:
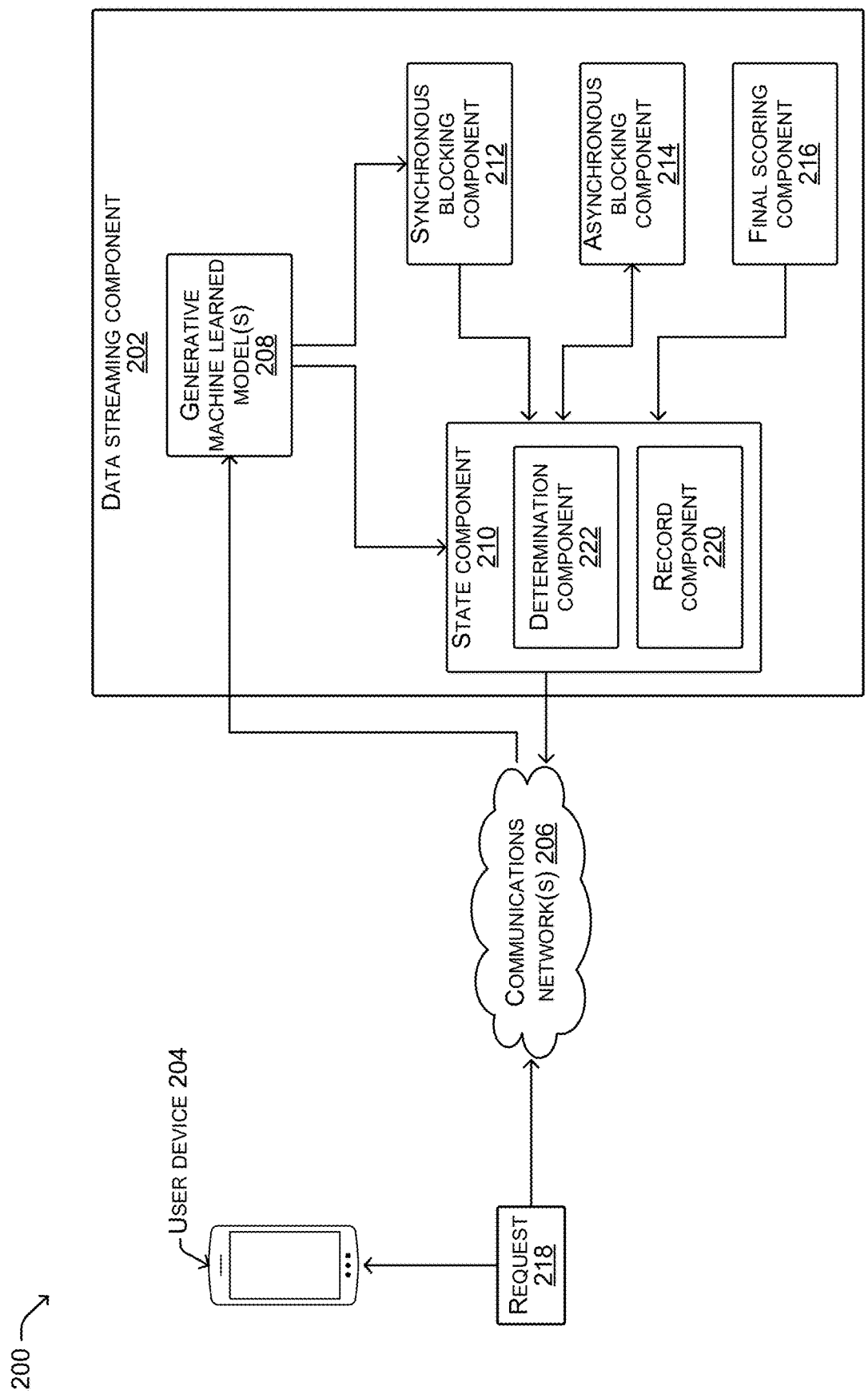
FIG. 2 depicts a block diagram illustrating the interactions of components of a data streaming component configured to synchronously and asynchronously filter generative machine learned model output.

FIG. 2 depicts a block diagram 200 illustrating the interactions of components of a data streaming component 202 configured to synchronously and asynchronously filter generative machine learned model output.

In some examples, the example block diagram 200 may be implemented with and/or in conjunction with a communication platform, search engine, sales-based platform, chatbot engine, and/or any other type of platform or system. In this example, the example block diagram 200 may include one or more user devices 204 configured to communicate with a communication platform via a communication network 206. Additionally, the example block diagram 200 may include a data streaming component 202 configured to stream filtered LLM output to the user device 204. In some examples, the data streaming component 202 may include a generative machine learned model(s) component 208 configured to perform various operations using one or more LLMs, a state component 210 configured to determine whether to filter out portions of the LLM output, a synchronous blocking component 212 configured to evaluate whether one or more LLM output tokens are to be blocked before the token(s) are output to the user device 204, an asynchronous blocking component 214 configured to evaluate whether one or more LLM output tokens are to be blocked after the token(s) have been output to the user device 204, and/or a final scoring component 216 configured to refine the entirety of the output to the user device 204.

In some examples, the example block diagram 200 may include one or more user devices 204 configured to communicate with a data streaming component 202. The example block diagram 200 includes a user device 204. In this example, the user device 204 may be a mobile phone; however, in other examples, the user device 204 may be any other type of mobile device (e.g., wearable, tablet, etc.), stationary device (e.g., laptop, desktop, etc.), and/or any other type of device. In this example, the user device 204 may communicate with the data streaming component 202 via the communication network(s) 106, as described in FIG. 1. In some examples, a user may use the user device 204 to send a request 218 to a system that includes the data streaming component 202. In such cases, the request 218 may include user data (e.g., user profile, username, user role, user organization/company, etc.) and/or the requested action for the system to perform. In this example, the request 218 may include instructions (e.g., a question, a command, data to rely on, etc.) for the system to perform a task that relies on an LLM. In such cases, the data streaming component 202 may generate input data to input to the LLM.

In some examples, the data streaming component 202 may include a generative machine learned model(s) component 208 configured to perform various operations using one or more LLMs. As noted above, the generative machine learned model(s) component 208 may include one or more LLMs that may be used to perform various tasks and/or operations. Accordingly, the generative machine learned model(s) component 208 may receive the input data (e.g., masked and non-masked data) and input the input data into an LLM. The LLM may be trained to output a subset of an entire response. That is, the LLM may output portions of the response (e.g., token(s)) in a streaming manner. As shown, the generative machine learned model(s) component 208 may send the LLM output token(s) to the state component 210 and the synchronous blocking component 212.

In some examples, the data streaming component 202 may include a state component 210 configured to determine whether to filter out portions of the LLM output. As shown, the state component 210 may receive the LLM output token(s) from the generative machine learned model(s) component 208. Further, the record component 220 may maintain a record about which token(s) the state component 210 has received and which of those token(s) have been evaluated by which synchronous and/or asynchronous blocking components. In such cases, the state component 210 may receive an instruction about whether to block the token(s) (e.g., whether the token(s) include undesirable content) from each of the applicable synchronous blocking component(s). Based on the record component 220 determining that all the synchronous and/or asynchronous blocking components have evaluated a token(s), the determination component 222 may determine whether to block the token(s).

When evaluating results from synchronous blocking component(s), the determination component 222 may determine whether to output the token(s) to the user device 204 or whether to block the token(s) such that the token(s) are not output to the user device 204. The determination component 222 may block any token if any of the synchronous blocking components indicate that the token(s) include undesirable content and/or to block the token(s).

When evaluating results from asynchronous blocking component(s), the determination component 222 may determine whether to remove the token(s) from the user interface of the user device 204 or whether to allow the token(s) to remain displayed via the user interface of the user device 204. The determination component 222 may remove any token(s) from the user device 204 if any of the asynchronous blocking components indicate that the token(s) include undesirable content and/or to remove the token(s).

In some examples, the data streaming component 202 may include a synchronous blocking component 212 configured to evaluate whether one or more LLM output tokens are to be blocked before the token(s) are output to the user device 204. As shown in FIG. 2, the synchronous blocking component 212 may receive the LLM output token(s) from the generative machine learned model(s) component 208. The synchronous blocking component 212 may be configured to evaluate whether the token(s) contain undesirable content and/or whether such token(s) are to be blocked prior to the token(s) being output to the user device 204. In some examples, the synchronous blocking component 212 may be configured to evaluate hateful speech, profanity, bias, factualness, and/or any other type of topic. As noted above, the synchronous blocking component 212 may include one or more machine learned models, classifiers, rules, heuristics, etc. to determine whether the token(s) include the undesirable content. In some examples, the synchronous blocking component 212 may send data (e.g., result(s), instruction(s), token(s), etc.) regarding whether the content includes the undesirable content to the state component 210. Though FIG. 2 shows a single synchronous blocking component 212, in other examples, the data streaming component 202 may include more than one synchronous blocking component 212.

In some examples, the data streaming component 202 may include an asynchronous blocking component 214 configured to evaluate whether one or more LLM output tokens are to be blocked (or removed) after the token(s) have been output to the user device 204. The asynchronous blocking component 214 may receive the token(s) upon the state component 210 outputting the token(s) to the user device 204. The asynchronous blocking component 214 may be designed to determine whether the token(s) contain undesirable content, similar to the synchronous blocking component 212. In some examples, the asynchronous blocking component 214 may send data (e.g., result(s), instruction(s), token(s), etc.) regarding whether the content includes the undesirable content to the state component 210.

In some examples, the data streaming component 202 may include a final scoring component 216 configured to refine the entirety of the output to the user device 204. The final scoring component 216 may receive all the content (or tokens) that were output to the user device 204. That is, the final scoring component 216 may receive the completed response. In some examples, the final scoring component 216 may score the completed response to determine whether any portion of the completed response is to be blocked. Prior to initiating the final evaluation, the final scoring component 216 may send a notification to the user device 204 that a final evaluation is about to take place. That is, the final scoring component 216 may display a popup box indicating that the system (or LLM) is refining the output, display a progress bar, grey out actionable user interface elements, disable functionality of the user device 204 (e.g., disable copy and paste), etc. The final scoring component 216 may input the entire response to one or more blocking components which may be the same or different as the synchronous and/or asynchronous blocking components. Based on receiving results from the blocking component(s), the final scoring component 216 may send the results to the state component 210 which may make a final determination as to whether to further refine (or filter out token(s)) the entire output.

Figure 3:
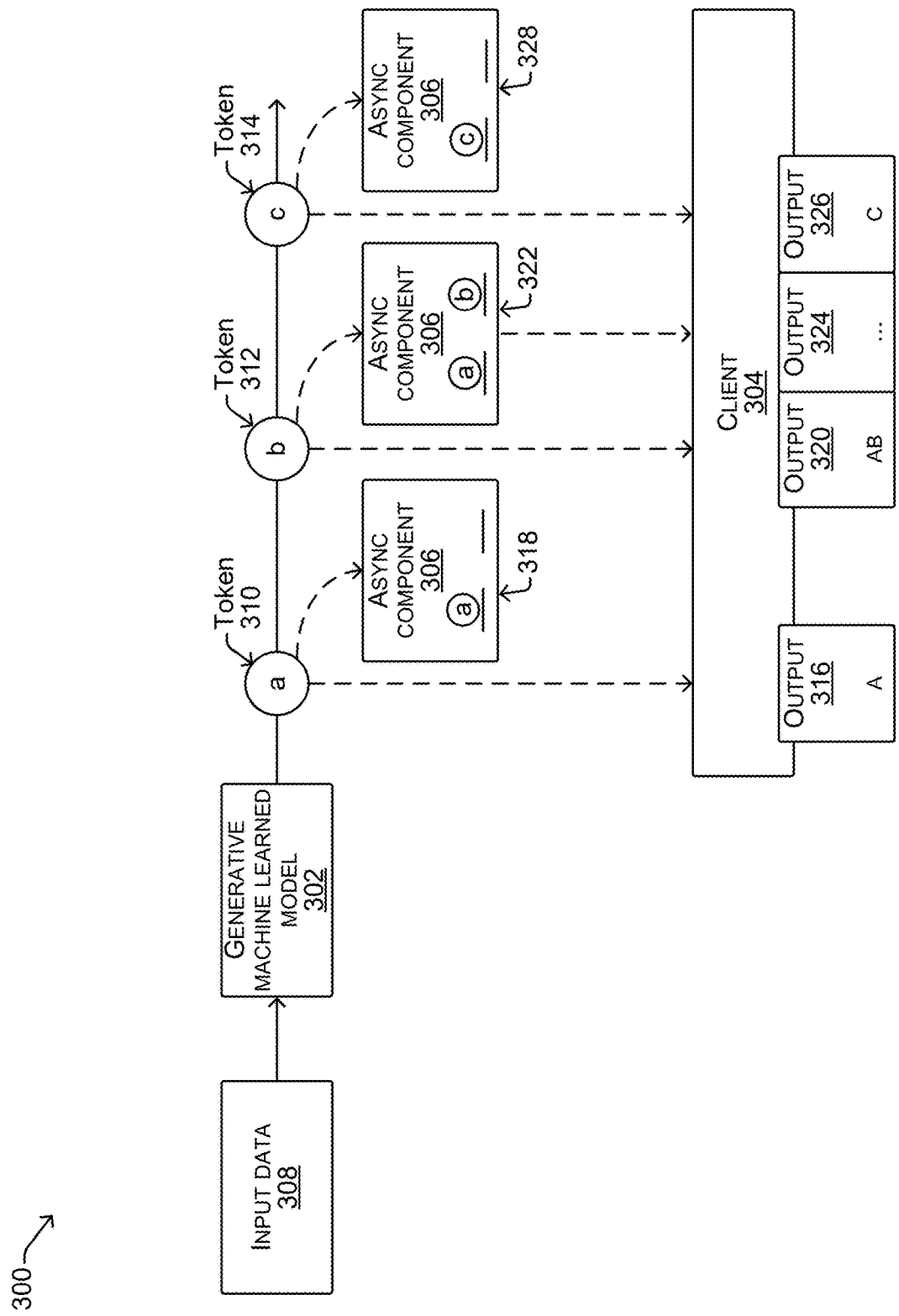
FIG. 3 illustrates a block diagram including an example generative machine learned model outputting token(s) to a client and to an asynchronous blocking component.

FIG. 3 illustrates a block diagram 300 including an example generative machine learned model component 302 outputting token(s) to a client 304 and to an asynchronous blocking component 306. Specifically, FIG. 3 illustrates that token(s) that are sent to the client 304 may also be sent to the asynchronous blocking component 306 for additional evaluation.

In this example, the block diagram 300 may illustrate inputting input data 308 into the generative machine learned model component 302. As described above, a user may request that a system perform an action. In such cases, the system may use one or more LLMs to perform aspects for the action and as such, the system may generate input data 308 to input into the LLM. The input data 308 may include the information needed for the LLM to fulfill or satisfy the user request. As shown, the input data 308 may be input into the generative machine learned model component 302.

In some examples, the generative machine learned model component 302 may be similar or identical to the generative machine learned model(s) component 208, as described in FIG. 2. The generative machine learned model component 302 may include one or more LLMs that are trained to perform one or more tasks and/or operations. In some examples, the LLM(s) may be trained to output portions for the response. That is, the LLM(s) may output (or stream) one or more tokens (e.g., less than the entire response) at a time. As shown, the LLM(s) may output token 310, token 312, and token 314. As shown, the token 310, token 312, and token 314 may be a portion of the entire response to output to the user. Further, the token 310, token 312, and token 314 may be output from the LLM at different times (or subsequent times). In this case, the token 310 may be output first, the token 312 may be output second, and the token 314 may be output third.

In some examples, the system may send the tokens to one or more synchronous blocking components and a state component (not shown). The synchronous blocking component(s) may evaluate the token(s) to determine whether the token(s) include content that is undesirable. The synchronous blocking component(s) may send a result (e.g., undesirable, block, don't block, etc.) to the state component which may, upon receiving the results from all the synchronous blocking component(s), determine whether to block (or filter out the token(s)) prior to such token(s) being output to the user device. In this case, the state component may determine that token 310, token 312, and token 314 may be output to the client 304 based on all the synchronous blocking components indicating that such token(s) lack undesirable content.

As shown, the system may send the token 310 to the client 304 at a first time. The client 304 may output the token 310 to the user device as output 316. In addition to outputting the token 310 to the user device, the system may also send the token 310 to the asynchronous blocking component 306 which may be configured to determine whether the token 310 has undesirable content. As shown, the asynchronous blocking component 306 may have a buffer size of two which may mean that the asynchronous blocking component 306 may evaluate the token 310 when the buffer has two token(s). As shown in box 318, the buffer of the asynchronous blocking component 306 may include a single token (e.g., token 310) and as such, the asynchronous blocking component 306 may wait until another token is received to process the token 310.

Further, the system may send the token 312 to the client 304 at a second time that is after the first time. The client 304 may display the token 312 as shown in output 320. Further, the system may also send the token 312 to the asynchronous blocking component 306. As shown in box 322, the asynchronous blocking component 306 may evaluate the token 312 based on the buffer of the asynchronous blocking component 306 being full. In this example, the asynchronous blocking component 306 may determine that the combination of token 310 and token 312 includes undesirable content and send these results to the state component. The state component may determine that the token 310 and the token 312 are to be removed from the user device and as such, the state component may send instructions to the client 304 which may remove the tokens, as shown in the output 324.

Further, the system may send the token 314 to the client 304 at third time that is after the first and second times. The client 304 may display the token 314 to the user device as shown in output 326. As shown, the token 314 may be the only token displayed in the output 326 based on the state component instructing the client 304 to remove the token 310 and the token 312. Further, the system may also send the token 314 to the asynchronous blocking component 306. In some examples and as shown in box 328, the asynchronous blocking component 306 may wait to evaluate the token 314 until the buffer is full.

In some examples, the system may continuously perform the operations described in FIG. 3 until the LLM has output all the tokens for the entire response.

Figure 4:
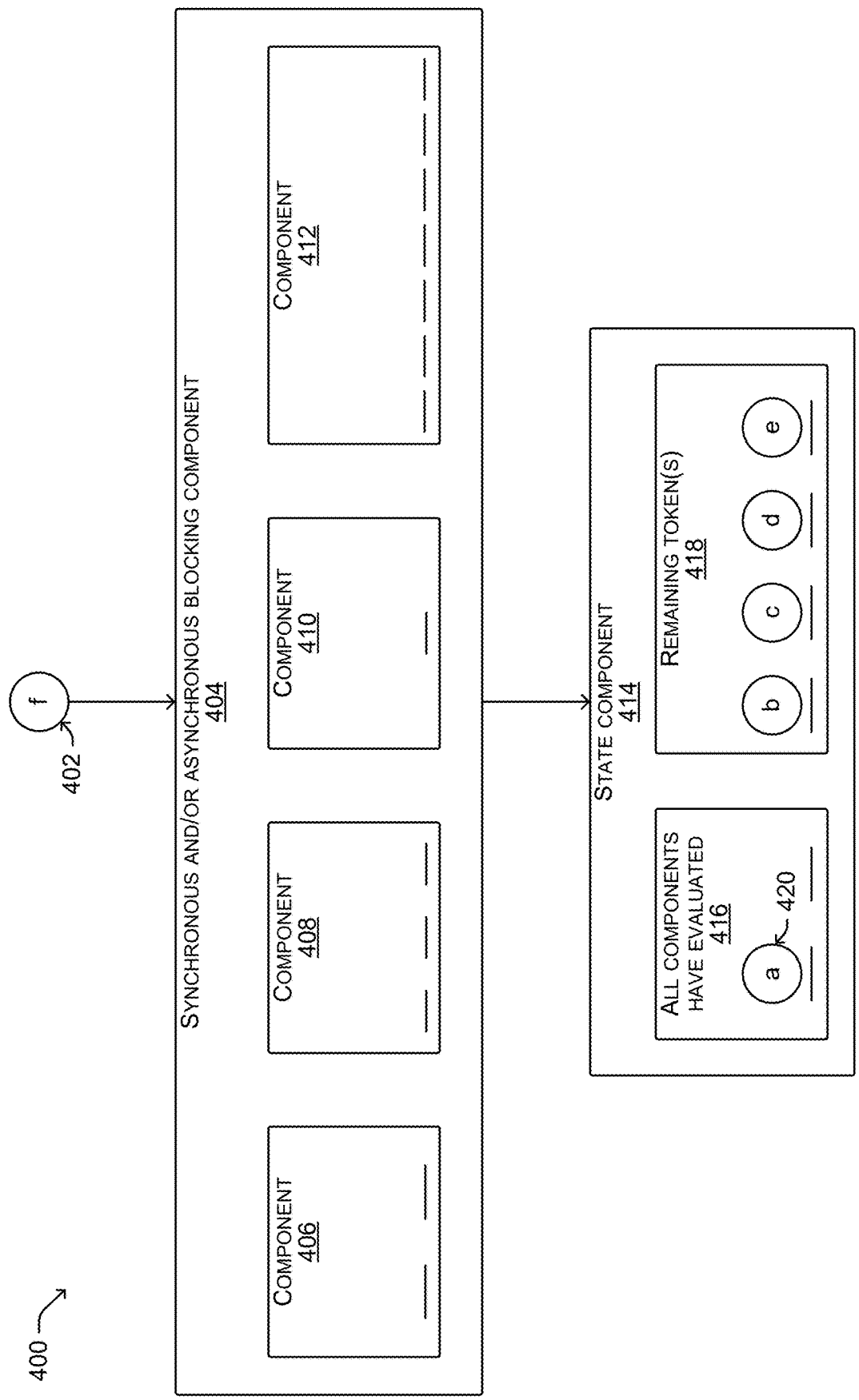
FIG. 4 illustrates a block diagram including an example synchronous blocking component, asynchronous blocking component, and/or a state component.

FIG. 4 illustrates a block diagram 400 including an example synchronous blocking component, asynchronous blocking component, and/or a state component. Specifically, FIG. 4 illustrates how the synchronous and/or asynchronous blocking components may send results to the state component at different times based on the buffer size of such components.

In this example, the block diagram 400 may include a token 402 being input into a synchronous and/or asynchronous blocking component 404. The token 402 may be output from an LLM. As such, after receiving the token 402 from the LLM, the block diagram 400 illustrates inputting the token 402 into the synchronous and/or asynchronous blocking component 404 to determine if the token 402 includes undesirable content.

In some examples, the synchronous and/or asynchronous blocking component 404 may include one or more components. As shown in FIG. 4, the synchronous and/or asynchronous blocking component 404 may include component 406, component 408, component 410, and component 412 (collectively referred to as the components). In this example, the components may include a buffer illustrated by the dashed lines within the component box. As noted above, the size of the buffer may be based on how much context the blocking component needs to make an accurate determination as to whether the token(s) include undesirable content. For example, component 406 may include a buffer size of two, component 408 may include a buffer size of three, component 410 may include a buffer size of one, component 412 may include a buffer size of seven. Accordingly, upon the buffer becoming full (e.g., the number of tokens in the buffer matches the buffer size), the blocking component may evaluate the token(s) in the buffer and send a result to the state component 414. However, based on the components of the synchronous and/or asynchronous blocking component 404 having differing buffer sizes, the components may evaluate the token(s) in the buffer and/or send response(s) at different times (or at different frequencies) from one another. For example, the component 406 may send responses to the state component 414 at a frequency that is higher than the frequency at which the component 412 is able to send results to the state component 414.

Based on the component(s) of the synchronous and/or asynchronous blocking component 404 sending results at different times for different token(s), the state component 414 may maintain a record of all the tokens that have been output by the LLM and which of those tokens have been evaluated by which blocking components. That is, since the state component 414 may determine whether to block or remove token(s) after having received all the results from the applicable blocking components, the state component 414 may record which tokens have been evaluated. For example, the state component 414 may include a box 416 that includes the tokens that have been evaluated by all the components. Further, the state component 414 may include box 418 that includes the tokens that have not been evaluated by all the components. As shown, box 416 may include token 420. As such, based on the token 420 having been evaluated by all the components, the state component 414 may analyze the results from such components and determine whether to block or remove the token 420. However, since the tokens in the box 418 have not yet been reviewed by all components, the state component 414 may wait to determine whether to block or remove the tokens included therein until all responses are received.

Figure 5:
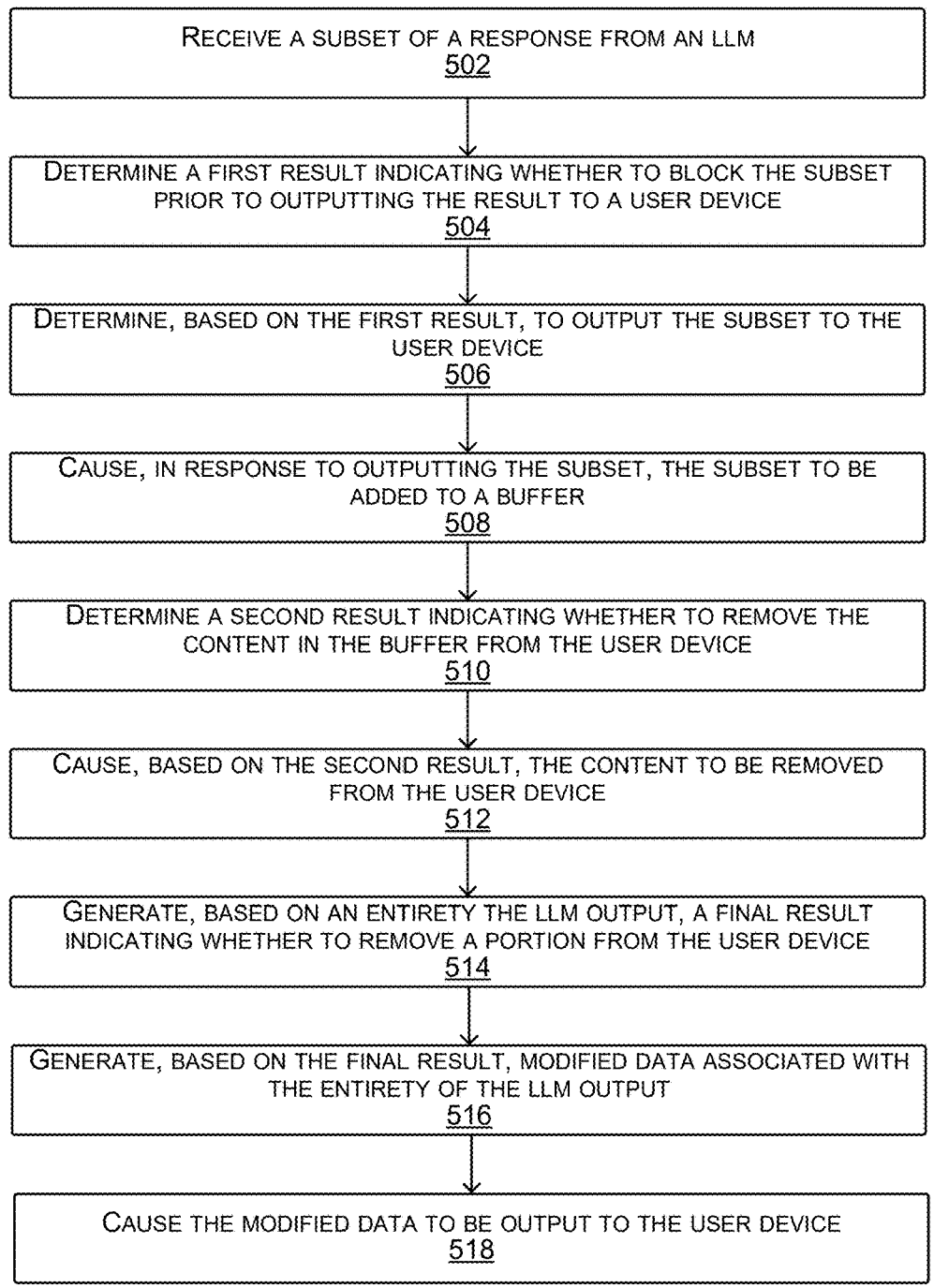
FIG. 5 is a flow diagram illustrating an example process for receiving a subset of an LLM response and determining whether to block and/or remove the subset from a user device.

FIG. 5 is a flow diagram illustrating an example process 500 for receiving a subset of an LLM response and determining whether to block and/or remove the subset from a user device. The processes illustrated in FIG. 5 is described with reference to components described above with reference to the example environment 100 shown in FIG. 1 for convenience and ease of understanding. However, the processes illustrated in FIG. 5 is not limited to being performed using the components described above with reference to the example environment 100. Moreover, the components described above with reference to the example environment 100 are not limited to performing the processes illustrated in FIG. 5.

Process 500 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 502, the process 500 can include receiving a subset of a response from an LLM. In some examples, the system may generate input data to input into the LLM based on a request (or user request). That is, the system may retrieve data to input into the LLM and use such data as the input data. The system may generate the input data by retrieving data from one or more sources. Such sources may include one or more databases within or otherwise associated with the system, information associated with the request (e.g., the question or command included in the request), etc. As such, the system may incorporate data from various sources when generating the input data.

In some examples, the system may input the input data into the LLM. In some examples, the input data may include non-masked data (e.g., non-sensitive or restricted data) and/or masked data (e.g., corresponding to sensitive data, restricted data, etc.). The system may include one or more generative machine learned models (e.g., LLMs) that may be trained to perform various system operations. In some cases, the system may train the LLMs to perform specific tasks. Accordingly, the system may input the input data into the LLM.

In some examples, the system may receive a subset (e.g., less than all) of an entire response from the LLM. The LLM may be trained to output the response in a streaming manner. That is, the LLM may output one token (e.g., unit of data (e.g., letter, number, etc.)) or a group of tokens (e.g., two or more characters-less than the entire response) at a time. Based on receiving the token(s), the system may perform one or more operations on the token(s) and output (or stream) the token(s) to the user profile. That is, the system can output tokens to the user profile prior to the entire LLM response being generated.

At operation 504, the process 500 can include determining a first result indicating whether to block the subset prior to outputting the result to a user device. In some examples, prior to outputting the token(s) (or subset of the response) to the user device, the system may determine whether to block (or filter out) the token(s). The system may block the token(s) if the token(s) are identified as including undesirable content. Such undesirable content may include hateful speech, profanity, bias, toxicity, factualness, etc. In some examples, users and/or organizations may configure the system such as to define which of the undesirable types of content to block. That is, as an example, a user or organization may instruct the system to block content related to hateful speech and bias, but not token(s) related to factualness. In other examples, the system may include a list of one or more undesirable types of content that overrides the topics provided by the user and/or organization.

In some examples, the system may use one or more blocking components (or blocking detectors) to detect token(s) related to undesirable content. For example, the system may include a hateful speech blocking component designed to determine whether the token(s) include hateful speech, a profanity blocking component designed to determine whether the token(s) include profanity, a bias blocking component designed to determine whether the token(s) include bias towards a specific perspective, a type of lifestyle, etc., a toxicity blocking component designed to determine whether the token(s) include toxic language, and/or a factualness blocking component designed to determine whether the token(s) incudes inaccurate or factual information. Of course, in other examples, the system may include more or less blocking components designed to block the same or different topics. In some examples, the abovementioned blocking components may use one or more machine learned models, classifiers, rules, and/or heuristics to determine whether the token(s) qualify to be blocked based on the type of blocking component.

As such, upon receiving the token(s) from the LLM, the system may send the token(s) to the synchronous blocking component(s) and to a state component (as described above). In such cases, the synchronous blocking component(s) may analyze the token(s) to determine whether the token(s) include undesirable content. The synchronous blocking component(s) may send the result(s) (e.g., the first result) to the state component.

At operation 506, the process 500 can include determining, based on the first result, to output the subset to the user device. In some examples, the system may include a state component (or state management component) configured to manage and/or receive data (or result(s)) from the various blocking detectors. The state component may listen to (or receive data from) all of the synchronous and/or asynchronous blocking component(s). Each blocking component may operate independent of the other blocking component(s) and as such, each blocking component may send unique data (e.g., whether to block the token(s), whether the token(s) quality as a type of content, etc.) to the state component. In some examples, when sending the token(s) to the synchronous blocking component(s), the system may also send the token(s) to the state component such that the state component has a list of all the token(s) that have been output by the LLM. The state component may maintain a record that indicates which synchronous and/or asynchronous blocking components have evaluated which token(s). When all the synchronous blocking component(s) have evaluated specific token(s), the state component may determine whether to block the token(s) or output the token(s) to the user device. In some examples, the state component may determine the outcome of the token(s) after the state component has received the result(s) (or data) from all the applicable blocking component(s).

In some examples, the state component may determine whether to block token(s) based on the data (or result(s)) received from the blocking component(s). The state component may determine that token(s) are to be blocked (either synchronously or asynchronously) if any of the blocking detectors indicate as such. That is, the state component may receive, from the blocking component(s), the token(s) and/or an indication as to whether such content is to be blocked. As such, upon receiving the results from each of the applicable blocking component(s), the state component may determine whether to block the token(s).

At operation 508, the process 500 can include causing, in response to outputting the subset, the subset to be added to a buffer. Based on displaying the token(s) to the user device, the state component (or the system) may send the token(s) to the applicable asynchronous blocking components. In such instances, the asynchronous blocking components may evaluate the token(s) to determine whether such token(s) are to be removed (or blocked) from the user device.

In some examples, the asynchronous blocking component(s) may receive the token(s) after the token(s) have been output to the user device. Similar to the synchronous blocking component(s), the asynchronous blocking components may have a buffer with unique buffer sizes. That is, for the asynchronous blocking components to accurately determine whether the token(s) include undesirable content, certain asynchronous blocking components may need a larger buffer (e.g., more token(s)) than other components.

At operation 510, the process 500 can include determining a second result indicating whether to remove the content in the buffer from the user device. When the status of the buffer indicates that the buffer is full of tokens (e.g., number of added tokens matches the buffer size), the asynchronous blocking components may determine whether to block the token(s). In some examples, the asynchronous blocking components may send individual (or unique) results to the state component.

At operation 512, the process 500 can include causing, based on the second result, the content to be removed from the user device. The state component may receive the results from the asynchronous blocking components and determine whether to allow the token(s) to remain displayed or whether to remove the token(s) (or block the token(s)). In this example, the state component may determine that one or more of the asynchronous blocking components determined that the token(s) within the buffer (e.g., contents of the buffer) include undesirable content and as such, the system may remove the token(s).

At operation 514, the process 500 can include generating, based on an entirety of the LLM response, a final result indicating whether to remove a portion from the user device. Upon blocking and/or outputting the entirety of the token(s), the system may perform a final evaluation that considers the entire output. That is, the system may receive all the token(s)

that have been output to the user device (or all the tokens that have been output from the LLM) and determine whether to refine the output. That is, the system may send a notification to the user device that the system is performing a final evaluation. The notification may be in the form of disabling buttons (or user interface elements) on the user device, greying out buttons, displaying a progress bar, displaying a popup box (or overlay interface) stating that a revision of the output is taking place.

In some examples, the system may perform the final evaluation by inputting the entire output into some or all of the blocking detectors. In such cases, the blocking detectors may identify token(s) within the entire output to block and send such data to the state component.

At operation 516, the process 500 can include generating, based on the final result, modified data associated with the entirety of the LLM response. As such, the state component may receive the result and modify the entire output to block or filter out certain tokens.

At operation 518, the process 500 can include causing the modified data to be output to the user device. Based on completing the final evaluation, the system may cause the modified output to be output (e.g., visually, audibly, etc.) to the user device.

EXAMPLE CLAUSES

A: A system comprising: one or more processors; and one or more non-transitory computer-readable media storing computer-executable instructions that, when executed, cause the one or more processors to perform operations comprising: receiving a subset of a response from a large language model (LLM); causing, prior to outputting the subset, the subset to be sent to a first blocking detector and a second blocking detector that is different than the first blocking detector; determining, based at least in part on the first blocking detector, a first result indicating whether to block the subset; determining, based at least in part on the second blocking detector, a second result indicating whether to block subset; determining, based at least in part on the first result and the second result, to output the subset of the response to a user device; causing, in response to outputting the subset of the response and prior to an entirety of the response being output, the subset to be added to a buffer associated with a third blocking detector configured to determine whether to block the subset after the subset has been output to the user device; determining, based at least in part on a status of the buffer, a third result indicating whether to block data within the buffer; generating, in response to the entirety of the response from the LLM being output, a final result representing whether to block a portion of the response; generating, based at least in part on the final result, modified data associated with the entirety of the response; and causing the modified data to be output.

B: The system of paragraph A, wherein the first blocking detector includes a second buffer to receive the subset, wherein the second blocking detector includes a third buffer to receive the subset, wherein a first size of the second buffer is different than a second size of the third buffer.

C: The system of paragraph B, wherein the first result is determined at a different time than the second result based at least in part on the first size of the second buffer being different than the second size of the third buffer.

D: The system of paragraph A, the operations further comprising: determining, based at least in part on the third blocking detector, to block the data in the buffer; and causing, based at least in part on determining to block the data in the buffer, the data to be removed from the user device.

E: The system of paragraph A, wherein generating the modified data is further based at least in part on: causing a notification to be sent to the user device, wherein the notification includes at least one of: an overlay interface, disabled functionality of the user device, or a modified user interface.

F: The system of paragraph A, wherein the first blocking detector blocks content associated with at least one of: hateful speech, profanity, bias, toxicity, or factualness.

G: One or more non-transitory computer-readable media storing instructions executable by one or more processors, wherein the instructions, when executed, cause the one or more processors to perform operations comprising: receiving a subset of a response from a large language model (LLM); causing, prior to outputting the subset, the subset to be sent to a first blocking detector; determining, based at least in part on the first blocking detector, a first result indicating whether to block the subset; determining, based at least in part on the first result, to output the subset of the response to a user device; causing, in response to outputting the subset of the response and prior to an entirety of the response being output, the subset to be added to a buffer associated with a second blocking detector configured to determine whether to block the subset after the subset has been output to the user device; determining, based at least in part on a status of the buffer, a second result indicating whether to block data within the buffer; generating, in response to the entirety of the response from the LLM being output, a final result representing whether to block a portion of the response; and generating, based at least in part on the final result, modified data associated with the entirety of the response.

H: The one or more non-transitory computer-readable media of paragraph G, where determining to output the subset to the user device is based at least in part on: causing the subset to be sent to a third blocking detector; and determining, based at least in part on the third blocking detector, a third result, wherein the first result is determined at a different time than the third result.

I: The one or more non-transitory computer-readable media of paragraph H, wherein determining the first result and the third result at different times is based at least in part on the first blocking detector including a second buffer to receive the subset, wherein the third blocking detector includes a third buffer to receive the subset, wherein a first size of the second buffer is different than a second size of the third buffer.

J: The one or more non-transitory computer-readable media of paragraph G, the operations further comprising: determining, based at least in part on the second blocking detector, to block the data in the buffer; and causing, based at least in part on determining to block the data in the buffer, the data to be removed from the user device.

K: The one or more non-transitory computer-readable media of paragraph G, wherein generating the modified data is further based at least in part on: causing a notification to be sent to the user device, wherein the notification includes at least one of: an overlay interface, disabled functionality of the user device, or a modified user interface.

L: The one or more non-transitory computer-readable media of paragraph G, wherein the first blocking detector blocks content associated with at least one of: hateful speech, profanity, bias, toxicity, or factualness.

M: The one or more non-transitory computer-readable media of paragraph G, the operations further comprising: causing, based at least in part on generating the modified data, the modified data to be output to the user device.

N: A method comprising: receiving a subset of a response from a large language model (LLM); causing, prior to outputting the subset, the subset to be sent to a first blocking detector; determining, based at least in part on the first blocking detector, a first result indicating whether to block the subset; determining, based at least in part on the first result, to output the subset of the response to a user device; causing, in response to outputting the subset of the response and prior to an entirety of the response being output, the subset to be added to a buffer associated with a second blocking detector configured to determine whether to block the subset after the subset has been output to the user device; determining, based at least in part on a status of the buffer, a second result indicating whether to block data within the buffer; generating, in response to the entirety of the response from the LLM being output, a final result representing whether to block a portion of the response; generating, based at least in part on the final result, modified data associated with the entirety of the response.

O: The method of paragraph N, where determining to output the subset to the user device is based at least in part on: causing the subset to be sent to a third blocking detector; and determining, based at least in part on the third blocking detector, a third result, wherein the first result is determined at a different time than the third result.

P: The method of paragraph O, wherein determining the first result and the third result at different times is based at least in part on the first blocking detector including a second buffer to receive the subset, wherein the third blocking detector includes a third buffer to receive the subset, wherein a first size of the second buffer is different than a second size of the third buffer.

Q: The method of paragraph N, further comprising: determining, based at least in part on the second blocking detector, to block the data in the buffer; and causing, based at least in part on determining to block the data in the buffer, the data to be removed from the user device.

R: The method of paragraph N, wherein generating the modified data is further based at least in part on: causing a notification to be sent to the user device, wherein the notification includes at least one of: an overlay interface, disabled functionality of the user device, or a modified user interface.

S: The method of paragraph N, wherein the first blocking detector blocks content associated with at least one of: hateful speech, profanity, bias, toxicity, or factualness.

T: The method of paragraph N, further comprising: causing, based at least in part on generating the modified data, the modified data to be output to the user device.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the one or more processors to perform operations comprising:
receiving a subset of a response from a large language model (LLM);
causing, prior to outputting the subset, the subset to be sent to a first blocking detector and a second blocking detector that is different than the first blocking detector;
determining, based at least in part on the first blocking detector, a first result indicating whether to block the subset;
determining, based at least in part on the second blocking detector, a second result indicating whether to block subset;
determining, based at least in part on the first result and the second result, to output the subset of the response to a user device;
causing, in response to outputting the subset of the response and prior to an entirety of the response being output, the subset to be added to a buffer associated with a third blocking detector configured to determine whether to block the subset after the subset has been output to the user device;

determining, based at least in part on a status of the buffer, a third result indicating whether to block data within the buffer;

generating, in response to the entirety of the response from the LLM being output, a final result representing whether to block a portion of the response;

generating, based at least in part on the final result, modified data associated with the entirety of the response; and causing the modified data to be output.

2. The system of claim 1, wherein the first blocking detector includes a second buffer to receive the subset, wherein the second blocking detector includes a third buffer to receive the subset, wherein a first size of the second buffer is different than a second size of the third buffer.

3. The system of claim 2, wherein the first result is determined at a different time than the second result based at least in part on the first size of the second buffer being different than the second size of the third buffer.

4. The system of claim 1, the operations further comprising:

determining, based at least in part on the third blocking detector, to block the data in the buffer; and causing, based at least in part on determining to block the data in the buffer, the data to be removed from the user device.

5. The system of claim 1, wherein generating the modified data is further based at least in part on:

causing a notification to be sent to the user device, wherein the notification includes at least one of:
an overlay interface,
disabled functionality of the user device, or
a modified user interface.

6. The system of claim 1, wherein the first blocking detector blocks content associated with at least one of:
hateful speech,
profanity,
bias,
toxicity, or
factualness.

7. One or more non-transitory computer-readable media storing instructions executable by one or more processors, wherein the instructions, when executed, cause the one or more processors to perform operations comprising:

receiving a subset of a response from a large language model (LLM);

causing, prior to outputting the subset, the subset to be sent to a first blocking detector;

determining, based at least in part on the first blocking detector, a first result indicating whether to block the subset;

determining, based at least in part on the first result, to output the subset of the response to a user device;

causing, in response to outputting the subset of the response and prior to an entirety of the response being output, the subset to be added to a buffer associated with a second blocking detector configured to determine whether to block the subset after the subset has been output to the user device;

determining, based at least in part on a status of the buffer, a second result indicating whether to block data within the buffer;

generating, in response to the entirety of the response from the LLM being output, a final result representing whether to block a portion of the response; and generating, based at least in part on the final result, modified data associated with the entirety of the response.

8. The one or more non-transitory computer-readable media of claim 7, where determining to output the subset to the user device is based at least in part on:

causing the subset to be sent to a third blocking detector; and determining, based at least in part on the third blocking detector, a third result, wherein the first result is determined at a different time than the third result.

9. The one or more non-transitory computer-readable media of claim 8, wherein determining the first result and the third result at different times is based at least in part on the first blocking detector including a second buffer to receive the subset, wherein the third blocking detector includes a third buffer to receive the subset, wherein a first size of the second buffer is different than a second size of the third buffer.

10. The one or more non-transitory computer-readable media of claim 7, the operations further comprising:

determining, based at least in part on the second blocking detector, to block the data in the buffer; and causing, based at least in part on determining to block the data in the buffer, the data to be removed from the user device.

11. The one or more non-transitory computer-readable media of claim 7, wherein generating the modified data is further based at least in part on:

causing a notification to be sent to the user device, wherein the notification includes at least one of:
an overlay interface,
disabled functionality of the user device, or
a modified user interface.

12. The one or more non-transitory computer-readable media of claim 7, wherein the first blocking detector blocks content associated with at least one of:
hateful speech,
profanity,
bias,
toxicity, or
factualness.

13. The one or more non-transitory computer-readable media of claim 7, the operations further comprising:

causing, based at least in part on generating the modified data, the modified data to be output to the user device.

14. A method comprising:

receiving a subset of a response from a large language model (LLM);

causing, prior to outputting the subset, the subset to be sent to a first blocking detector;

determining, based at least in part on the first blocking detector, a first result indicating whether to block the subset;

determining, based at least in part on the first result, to output the subset of the response to a user device;

causing, in response to outputting the subset of the response and prior to an entirety of the response being output, the subset to be added to a buffer associated with a second blocking detector configured to determine whether to block the subset after the subset has been output to the user device;

determining, based at least in part on a status of the buffer, a second result indicating whether to block data within the buffer;

generating, in response to the entirety of the response from the LLM being output, a final result representing whether to block a portion of the response;

generating, based at least in part on the final result, modified data associated with the entirety of the response.

15. The method of claim 14, where determining to output the subset to the user device is based at least in part on:

causing the subset to be sent to a third blocking detector; and determining, based at least in part on the third blocking detector, a third result, wherein the first result is determined at a different time than the third result.

16. The method of claim 15, wherein determining the first result and the third result at different times is based at least in part on the first blocking detector including a second buffer to receive the subset, wherein the third blocking detector includes a third buffer to receive the subset, wherein a first size of the second buffer is different than a second size of the third buffer.

17. The method of claim 14, further comprising:

determining, based at least in part on the second blocking detector, to block the data in the buffer; and causing, based at least in part on determining to block the data in the buffer, the data to be removed from the user device.

18. The method of claim 14, wherein generating the modified data is further based at least in part on:

causing a notification to be sent to the user device, wherein the notification includes at least one of:

an overlay interface, disabled functionality of the user device, or a modified user interface.

19. The method of claim 14, wherein the first blocking detector blocks content associated with at least one of:

hateful speech, profanity, bias, toxicity, or factualness.

20. The method of claim 14, further comprising:

causing, based at least in part on generating the modified data, the modified data to be output to the user device.

* * * * *